Figure 1:
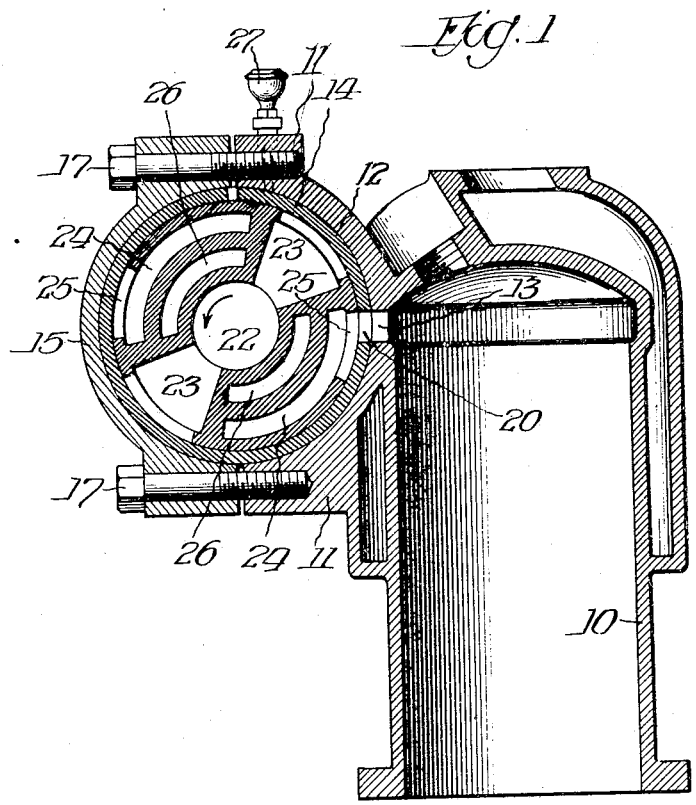

B. D. STEVENS.
VALVE FOR ENGINES.
APPLICATION FILED OCT. 11, 1913.

1,261,966.

Patented Apr. 9, 1918.
2 SHEETS—SHEET 1.

Witnesses:

Inventor:
Burt D. Stevens

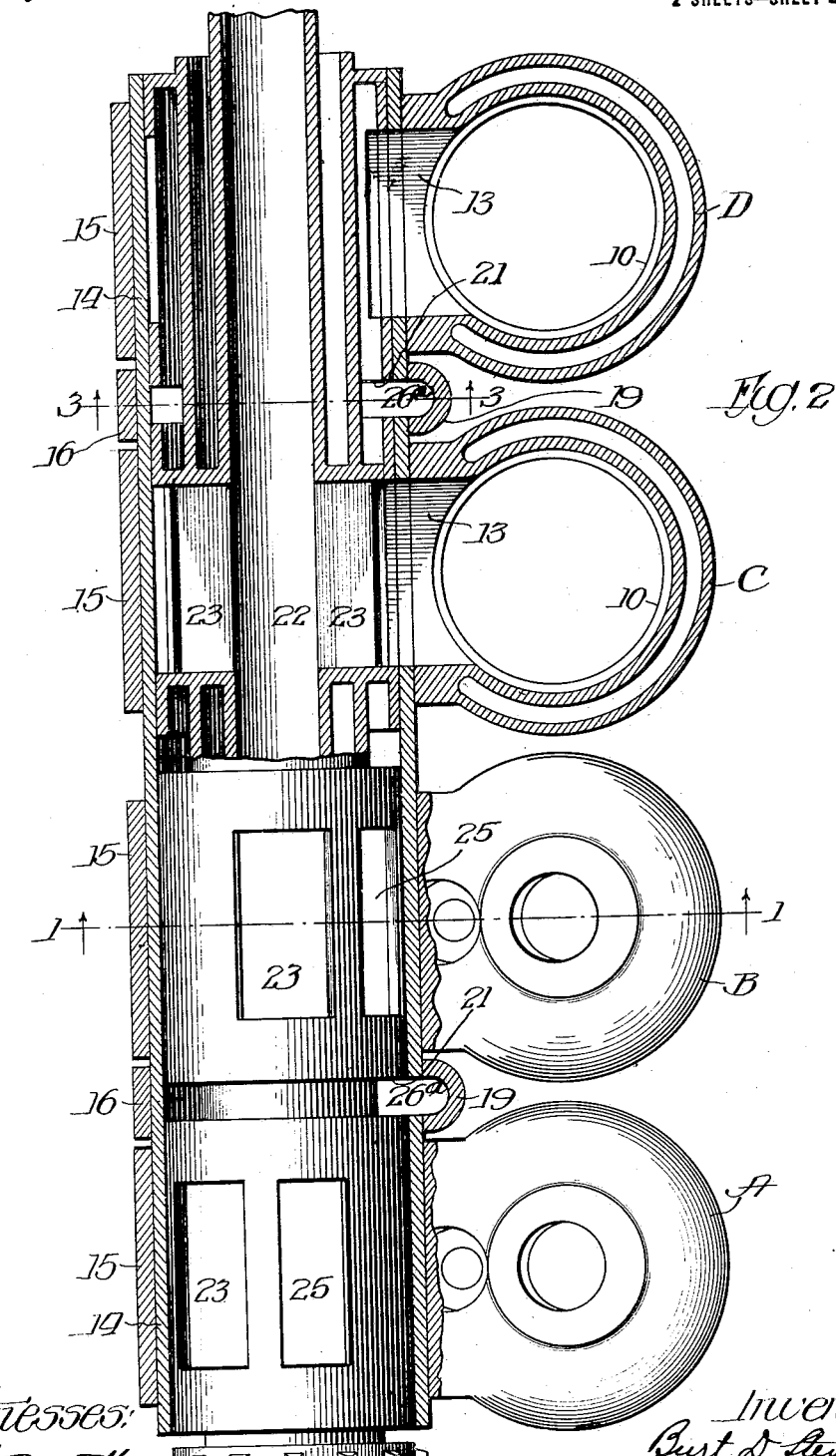

UNITED STATES PATENT OFFICE.

BURT D. STEVENS, OF RIVERSIDE, ILLINOIS, ASSIGNOR OF THREE-FOURTHS TO WILLIAM V. KELLEY, OF CHICAGO, ILLINOIS.

VALVE FOR ENGINES.

1,261,966.  Specification of Letters Patent.  Patented Apr. 9, 1918.

Application filed October 11, 1913. Serial No. 794,559.

*To all whom it may concern:*

Be it known that I, BURT D. STEVENS, a citizen of the United States, and resident of Riverside, in the county of Cook and State of Illinois, have invented certain new and useful Improvements in Valves for Engines, of which the following is a specification.

My invention relates to valves for engines and has particular reference to a novel rotary valve adapted for use in connection with hydro-carbon engines.

In hydro-carbon engines the problem of admitting the gaseous vapor and permitting the escape of products of combustion has received serious attention. The requisites of the controlling means should be simplicity, capacity for adjustment to take up wear, elimination of springs and absence of noise in operation. In the three prevalent types of valve actions, namely, puppet, slide and rotary, all of the objections have been overcome but not in the same structure. Puppet valves are noisy and require frequent grinding to prevent loss of compression; slide or sleeve valves present many difficulties in the matter of lubrication and add greatly to the cost of construction; the rotary valve presents a heretofore insurmountable difficulty in the matter of excessive heating which destroyed the value of any lubricant used in connection therewith. Usually such rotary valves extend longitudinally in the line of a multiple cylinder engine, the exhaust from all cylinders passing longitudinally through the valve. This, as will be readily understood, highly heated the valve member causing a considerable degree of expansion and contraction, thus making difficult an adjustment which would prevent leakage.

One of the principal objects of the present invention is to provide a rotary valve arranged in the longitudinal line of a multiple cylinder engine, the valve member of which shall provide a plurality of conduits, preferably an axially central, straight exhaust opening, a pair of outer intake conduits and an intermediate conduit adapted to receive a cooling medium. By this arrangement the exhaust conduit which is located in the center is not permitted to unduly heat the bearing surfaces of the valve, there being interposed between the conduit and the bearing surfaces two conduits, each of which shall act as a heat diffuser. The intermediate conduit is arranged to permit the circulation of cooling air directed thereinto either by the engine fan or by independent means, and the outer intake conduit through which the gaseous vapor is drawn to the cylinder from the carbureter acts as an additional cooling means. It is well known that the passage through a conduit of a gaseous vapor such as is required by hydro-carbon engines causes under normal conditions a withdrawal of heat units from the conduit to such an extent that even though the parts of the engine may be exceedingly hot, the intake manifold will be invariably cold to the touch. Thus it will be seen there is interposed between the exhaust conduit and the bearing surface of the valve two efficient heat absorbing conduits by means of which the bearing surface of the valve is kept cool thus preventing excessive expansion and contraction which destroys tight connections and permitting efficient lubrication.

As a further preventive to excessive heating I have provided a relatively large valve and doubled the conduits; that is, the valve is actually a double valve providing for two intake conduits and two ports opening into the exhaust conduit. The effect secured is that of increasing largely the heat diffusing area of the valve. In order that the valve may be kept tight at all times to prevent leakage of compression, I preferably mount the rotatable valve member within a split sleeve maintaining the parts in position by means of a suitable cap. It will be seen that a very slight pressure of the cap will tighten the split sleeve on the valve member and take up any possible wear. In addition, the maintaining of a film of oil between the inner surface of the sleeve and the exterior of the valve in connection with the long bearing of the valve, provides an absolutely leak-proof valve structure.

Other advantages will appear hereinafter and be more specifically pointed out in the claims.

Figure 3:
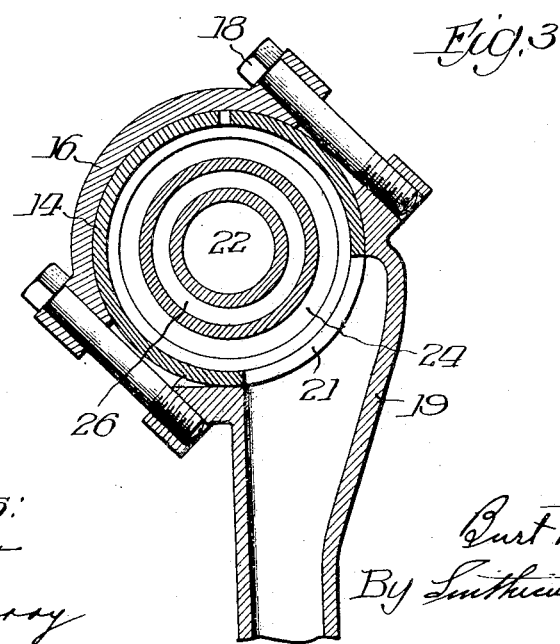

The invention will be more readily understood by reference to the accompanying drawings, wherein, Figure 1 is a vertical section through an engine cylinder and one of my novel valves taken on the line 1—1 of Fig. 2;

Fig. 2 is a plan view partially in section of a multiple cylinder engine showing my novel valve applied thereto, and, Fig. 3 is a section on the line 3—3 of Fig. 2.

Referring more particularly to the drawings it will be seen that on an engine cylinder 10, in the preferred construction, I provide an integral bracket or extension 11, within which is located a semi-circular seat 12. A single port 13, through the engine cylinder, provides for the inlet and exhaust of gases to and from the cylinder. Mounted within the semi-circular seat 12, is a split sleeve 14, extending along the longitudinal line of the four cylinders and held in position by means of a plurality of caps 15, 16, and cap bolts 17, 18. Cap 15 is wide and extends over a space substantially equal to the diameter of a cylinder, whereas the caps 16 are narrow and are designed only to assist in securing a sub-manifold 19 in place. In a four cylinder engine two of such sub-manifolds 19 are provided, these being located between the cylinders A, B, and C, D, these sub-manifolds communicating with a main manifold not shown, which may be directly connected to the carbureter. The sleeve 14, is provided with ports 20, 21, the former registering with the port 13, in the cylinder and the latter registering with the opening in the sub-manifold 19. The sleeve 14 being non-rotatable, these ports bear a fixed relation to the ports referred to.

The valve member which comprises the novel feature of my invention is seated within the split sleeve 14, and consists of a tubular member having an axially central, straight conduit 22, extending throughout the length of the valve member. Communication is had between this conduit and the port 13 by means of a pair of radially extending ports 23, these ports registering with the port 13 alternately as the valve rotates. It will be understood that a pair of these ports 23 is provided for each cylinder, one of the ports 23 being shown in register with the port 13 of the cylinder C in Fig. 2. Near the exterior of the valve member I provide conduits 24, 24, through which the combustible gases are conducted from the carbureter to the cylinder. Each of these conduits is provided with a port 25, registering alternately with the port 13 of the engine cylinder, one of these ports being shown in such position in Fig. 1. It will be noted that these ports are not arranged in the same longitudinal line throughout the length of the valve member but are offset 90° in each adjacent cylinder. Communication is had, however, between the conduits 24, as relates to adjacent cylinders, that is to say, conduits 24 for the cylinders A and B, open into a common recess 26ᵃ, in the valve member and are served by the sub-manifold 19.

This is likewise true as to cylinders C and D. There is no communication, however, between conduits 24, at the point between cylinders B and C. By the timing of the valve member to rotate in the ratio of one to four to the engine crank shaft it will be seen that the conduits 24 are alternately in communication with the engine cylinder and that the outer surface of the valve member has heat units absorbed therefrom by the passage of the combustible gas therethrough while the valve member is traveling through three-fourths of its movement. These heat units are absorbed partially by the incoming gases, thus causing a desirable expansion thereof and are diffused throughout the body of metal which is exposed to the air.

In cold weather this absorption of heat units by the incoming gases is desirable and would not be excessive. However, in warmer weather the extreme heating of the exhaust conduit would unduly heat the incoming gases, thus causing an excessive expansion, preventing the proper mixture and I have therefore interposed a conduit 26 between the intake conduits 24, and the exhaust conduit 22. These conduits 26 extend from end to end of the valve member but are not in a straight line; that is, the conduit opposite cylinder B will be located at an angle of 90° with the cylinders A and C. This is made necessary by the location of the exhaust ports 23 in the valve member. However, the conduits 26 are continuous and provide for a circulation of air from end to end of the valve, the air current being superinduced by individual air fans or in conjunction with the usual cooling fan on the engine. Thus the excessive heat of the exhaust conduit is disseminated directly from its surface. Any heat not thus carried away is diffused throughout the surrounding walls or thereafter being transferred to the incoming combustible gas.

Any approved form of oiling devices may be used, such for instance as the oil cups 27. It will be understood, of course, that it may be often preferable to connect the valve with the usual oiling system of the engine whereby pressure feed instead of gravity feed is provided.

The rotation of the valve member may be accomplished by any approved means, a chain, not shown, preferably being used to connect a sprocket wheel 28 with the crank shaft of the engine.

It is obvious from the description and drawings that the construction shown is typical only of many forms which might be devised including the principles here set forth. I do not wish therefore, to be limited to the exact construction shown.

I claim:

1. In a device of the class described, the combination of an engine cylinder having a port, and a rotatable valve member, said member being arranged transversely of the cylinder and constructed to provide an axially central straight conduit and an irregularly disposed outer conduit, substantially as described.

2. In a device of the class described, the combination of an engine cylinder having an inlet and exhaust port, and a rotatable valve member, said member being arranged transversely of the cylinder and constructed to provide an axially central straight conduit, an irregularly disposed outer conduit, and an intermediate irregularly disposed cooling conduit, substantially as described.

3. In a device of the class described, the combination of a multiple cylinder, hydrocarbon engine, each cylinder having inlet and outlet ports, and a rotatable valve member transversely disposed with relation to said cylinders, said valve member being constructed to provide a single centrally disposed exhaust conduit, and two outer irregular intake conduits, said intake conduits communicating alternately with the intake ports of said cylinders, substantially as described.

4. In a device of the class described, the combination of a multiple cylinder, hydrocarbon engine, each cylinder having inlet and outlet ports, and a rotatable valve member transversely disposed with relation to said cylinders, said valve member being constructed to provide a single centrally disposed exhaust conduit, two outer irregular intake conduits, said intake conduits communicating alternately with the intake ports of said cylinders, and a pair of cooling conduits located intermediate said intake and exhaust conduits, substantially as described.

5. In a device of the class described, the combination of an engine cylinder having inlet and exhaust ports, a rotatable cylindrical valve controlling the entrance and exit of gases through said ports, a split sleeve within which said valve is rotated, and means for exerting pressure on said sleeve whereby wear on said valve may be taken up, substantially as described.

6. A tubular combined intake and exhaust valve comprising concentric intake and exhaust conduits, the exhaust conduit being surrounded by the intake passage and having double spaced walls affording a cooling chamber to prevent overheating of the intake gases.

7. A rotary valve for internal combustion engines, said valve having a central exhaust chamber, and a plurality of other concentric cooling chambers between the exhaust chamber and the outer wall of the valve, the walls of said chamber being rigidly connected to form a single rotatable valve body.

8. A valve for internal combustion engines comprising a casing having a circular bore, and a rotatable valve member mounted in the bore and provided with a longitudinal exhaust passage having a port opening through the outer periphery of the valve member, said valve member having a longitudinal intake passage outside of the exhaust passage and provided with a port intersecting the outer periphery of the valve member, and said valve member also having a longitudinal passage located between the exhaust and intake passages constituting a chamber for the reception of a cooling medium.

9. A valve for internal combustion engines comprising a casing having a cylindrical bore, a cylindrical valve member mounted in the bore and rotatable upon its longitudinal axis, said rotatable member having a central longitudinal exhaust passage provided with a port intersecting the outer periphery of the valve member, said valve member being provided with a longitudinal intake passage located outside of the exhaust passage and provided with a port intersecting the outer periphery of the valve member, and said valve member also being provided with a longitudinal passage located between the exhaust and intake passages and constituting a cooling chamber for the reception of a cooling medium.

Signed at Chicago, county of Cook, State of Illinois.

BURT D. STEVENS.

Witnesses:
CHAS. F. MURRAY,
T. D. BUTLER.